United States Patent
Fojtik et al.

(10) Patent No.: US 8,276,014 B2
(45) Date of Patent: Sep. 25, 2012

(54) STALLING SYNCHRONISATION CIRCUITS IN RESPONSE TO A LATE DATA SIGNAL

(75) Inventors: Matthew Rudolph Fojtik, Ann Arbor, MI (US); Dennis Michael Sylvester, Ann Arbor, MI (US); David Theodore Blaauw, Ann Arbor, MI (US); David Alan Fick, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 415 days.

(21) Appl. No.: 12/656,708

(22) Filed: Feb. 12, 2010

(65) Prior Publication Data
US 2011/0202786 A1 Aug. 18, 2011

(51) Int. Cl.
*G06F 1/12* (2006.01)
(52) U.S. Cl. ......... 713/401; 713/400; 713/503; 713/600
(58) Field of Classification Search .................. 713/401, 713/400, 503
See application file for complete search history.

(56) References Cited

U.S. PATENT DOCUMENTS

| | | | |
|---|---|---|---|
| 6,771,099 B2* | 8/2004 | Cavazos et al. | 327/141 |
| 6,834,255 B2* | 12/2004 | Abrosimov et al. | 702/181 |
| 6,906,555 B2* | 6/2005 | Ma | 326/94 |
| 7,233,170 B2* | 6/2007 | Becker et al. | 326/93 |
| 7,880,506 B2* | 2/2011 | Felix | 326/94 |
| 2007/0217559 A1* | 9/2007 | Stott et al. | 375/355 |

\* cited by examiner

*Primary Examiner* — Nitin Patel
(74) *Attorney, Agent, or Firm* — Nixon & Vanderhye P.C.

(57) ABSTRACT

A data processing circuitry for processing data is disclosed. The data processing circuitry comprises: a plurality of synchronization circuits for capturing and transmitting the data in response to a clock signal and a plurality of combinational circuits arranged between the synchronization circuits for processing the data, the plurality of synchronization circuits being arranged in at least two groups; an error detecting circuit for determining if the data input to one of the plurality of synchronization circuits is stable during a predetermined time and for signalling an error if the data input is unstable, the predetermined time being less than a half cycle of the clock signal; control circuitry responsive to said error detecting circuit signalling said error to transmit a control signal to at least one of said groups of synchronization circuits that contains a subsequent synchronization circuit that said synchronization circuit with said unstable input is configured to transmit said data to; each of said group of synchronization circuits being configured to respond to receipt of said control signal to stall for a clock cycle and to transmit a stall signal to at least one further group of synchronization circuits that said group of synchronization circuits is configured to transmit data to or receive data from; each of said group of synchronization circuits being configured to respond to receipt of said stall signal provided they have not stalled in a preceding clock cycle to stall for a clock cycle and to transmit a stall signal to said at least one further group of synchronization circuits.

23 Claims, 6 Drawing Sheets

FIG. 1

Stall Propogation Through a Chain of Latches

FIG. 2

A Loop and the Time the Latch Stalls, Counted in Half Cycles

STALLING SYNCHRONISATION CIRCUITS IN RESPONSE TO A LATE DATA SIGNAL

BACKGROUND OF THE INVENTION

1. Field of the Invention

The field of the invention relates to the field of data processing and in particular to detecting and responding to errors.

2. Description of the Prior Art

Typical digital systems need to provide the correct output all of the time, and as these systems involve data being sampled at periodic intervals, ample time must be allowed for all combinational logic such that data will be ready under the worst operating conditions, most critical paths and most variable silicon. In order to account for these worst cases large margins are introduced which during normal operation are not needed and are a waste of power and performance.

Another known way of addressing this problem is a razor-based system produced by ARM® Limited of Cambridge England. This is a system that is designed to operate at a point beyond this estimated absolute safe limit, the system having an error detection and recovery means to recover from cases where the signal does not reach the output in time. This system has a speculation region at the end of the clock cycle during which the output signal is measured to see if it is stable. Thus, provided any output signal attains its final value within this region, this will be detected, and if this final value is not the value at the end of the clock cycle, this can be determined and corrected for. As the system has this error detecting and correcting capability, the system does not need to put safety margins into the clock frequency and operational voltage. In effect it can tune its operational voltage and/or frequency to be in a range where errors are unlikely but may occur. However, in order to correct for detected errors, the system generally needs to perform some restoring function to restore the state to its correct value and to reissue the instruction that failed. This has overheads in area and timing.

It would be desirable to be able to provide a system with some error correcting capabilities to enable smaller margins to be used, without unduly increasing the complexity of the circuit.

SUMMARY OF THE INVENTION

A first aspect of the present invention provides a data processing circuitry for processing data, said data processing circuitry comprising: a plurality of synchronisation circuits for capturing and transmitting said data in response to a clock signal and a plurality of combinational circuits arranged between said synchronisation circuits for processing said data, said plurality of synchronisation circuits being arranged in at least two groups; an error detecting circuit for determining if said data input to one of said plurality of synchronisation circuits is stable during a predetermined time and for signalling an error if said data input is unstable; control circuitry responsive to said error detecting circuit signalling said error to transmit a control signal to at least one of said groups of synchronisation circuits that contains a subsequent synchronisation circuit that said synchronisation circuit with said unstable input is configured to transmit said data to; each of said group of synchronisation circuits being configured to respond to receipt of said control signal to transmit a stall signal to at least one further group of synchronisation circuits that said group of synchronisation circuits is configured to transmit data to, or receive data from; each of said group of synchronisation circuits being configured to respond to receipt of said stall signal provided they have not stalled in the preceding clock cycle to stall for a clock cycle and to transmit a stall signal to said at least one further group of synchronisation circuits.

The present invention provides a system which provides the ability to detect instabilities on an input signal that occur within a predetermined time. In this way the system can detect cases where the data signal is not propagating through the system at the required rate, and is therefore changing during a period where it is expected to be stable. It deals with this error in an architecturally agnostic way by simply sending a control signal to initiate stalling of synchronisation circuits that receive the data. In this way, although the data may be changing late, synchronisation circuit(s) receiving it can be stalled for a cycle and this extra time allows for the data signal that was changing late to change within the required time.

In order for the rest of the system to be aligned with this delay, synchronisation circuits are configured to respond to receiving a stall signal by not only stalling but by transmitting the stall signal to further groups of synchronisation circuits. In this way, the stall propagates both forwards and backwards through the system along the path followed by the data signal and an additional delay is added across the system. This additional delay allows the late data signal to arrive within the required time, and in this way the timing error is corrected by simply adding an additional one clock cycle delay across the system. Thus, the output data is output a clock cycle later than would have been the case had the error not been detected, but it is the correct data. If a synchronisation element stalled in a previous cycle then it will not stall again in response to receipt of a stall signal and neither will it transmit the stall signal further.

Thus, the error is corrected for without the need to perform any steps to reissue any instructions, the correction is performed by simply adding a delay throughout the system to compensate for the detected delayed data signal. Furthermore, as the delay in the form of a stall, is propagated throughout the system along with the data, a stall of the whole system is provided without the need for a stall signal to be sent through the system in the same clock cycle, which is nearly impossible in a large system.

In some embodiments each of said group of synchronisation circuits are configured to respond to receipt of said control signal to stall for a clock cycle and to transmit said stall signal.

Although in some embodiments the control signal only triggers transmission of stall signals, which may be the case where it is not necessary for immediately following synchronisation circuits to stall, in others the control signal triggers the circuits receiving the signal to both transmit stall signals and to stall themselves. This can be advantageous as it reduces the number of signals that need to be sent and also allows the initial stalling to occur in response to one rather than two control signals.

In some embodiments said at least one further group of synchronisation circuits comprises all groups that contain neighbouring subsequent synchronisation circuits except those groups that said stall signal has been received from.

The potential problem of a stall that is propagated through a system in this way not resolving and eventually terminating in a cyclic circuit may be addressed by configuring the synchronisation circuits not to respond to receipt of a stall signal if they stalled in a previous cycle. Alternatively it can be addressed by propagating the stall signals to neighbouring circuits or groups of circuits except for those that have sent the stall signal. In this way a synchronisation circuit that has stalled in a preceding cycle will never receive a stall signal and will not need to be configured not to respond to it if it has previously stalled. Thus, by following this technique every synchronisation circuit in the design will stall once and only once and the stall will terminate when a synchronisation circuit is told by all of its neighbours to stall, for at that point there will be no neighbouring subsequent synchronisation circuit that said stall signal has not been received from. In the case of a synchronisation circuit having a single neighbour then the signal will not be propagated at all.

In some embodiments said subsequent synchronisation circuit is a neighbouring subsequent synchronisation circuit.

The group of synchronisation circuits the control signal is sent to may be a group which contains a neighbouring subsequent synchronisation circuit that the unstable data signal is transmitted to. This may be a direct neighbour with no intermediate synchronisation circuits or in some embodiments it may be a synchronisation circuit that is close to the synchronisation circuit having the unstable input but removed from it by at least one intermediate synchronisation circuit.

In some embodiments said predetermined time is half a clock cycle or less.

Many synchronisation circuits are designed to capture data during a particular phase of the clock cycle and with data processing circuitry with these synchronisation circuits signals arriving after this phase of the clock cycle are late, and thus, an appropriate predetermined time to monitor is half a clock cycle or less.

In some embodiments, no synchronisation circuit is a member of more than one group, and each group comprises at least one synchronisation circuit.

Although the stall signal can be sent to individual synchronisation circuits so that in effect each group contains a single circuit and they are all controlled individually this has more overheads than if the synchronisation circuits are clustered together in groups and the same rules followed.

In some embodiments, said circuitry comprises a plurality of neighbouring subsequent synchronisation circuits, said control circuitry being responsive to said error detecting circuit signalling said error to transmit a control signal to all groups of synchronisation circuits that comprise at least one of said plurality of neighbouring subsequent synchronisation circuits.

The data processing circuitry may be arranged so that synchronisation circuits transmit their data forward to several synchronisation circuits. In this case, in response to detecting an error due to a late changing data signal on the input to one of the synchronisation circuits the control circuit sends the control signal initiating a stall to all of the groups of synchronisation circuits that the synchronisation circuits send data to.

In some embodiments, said control circuitry is responsive to said error detecting circuitry detecting said error to transmit said control signal to said group containing said neighbouring subsequent synchronisation circuit such that said group starts said clock cycle stall during an immediately following half clock cycle to said half clock cycle that said data input was detected as being unstable in.

In other embodiments, said at least one of said groups of synchronisation circuits that said control signal is transmitted to contains said subsequent synchronisation circuit, and said subsequent synchronisation circuit is a synchronisation circuit that said synchronisation circuit with said unstable input is configured to transmit data to via one intermediate synchronisation circuit, said control circuitry is responsive to said error detecting circuitry detecting said error to transmit said control signal to said at least one group containing said subsequent synchronisation circuit such that said group stalls for a clock cycle one cycle later than said half clock cycle that said data input was detected as being unstable in.

It may be necessary to transmit the stall signal to neighbouring synchronisation circuits or groups of synchronisation circuits within a half clock cycle following the half clock cycle that the unstable data input was detected in. However, in some arrangements of the circuits it may be that the error will not be propagated to the immediately following synchronisation circuit and thus, an additional half cycle can be allowed between the detected late data transition and the first clock gating event. This first clock gating event is then performed for synchronisation circuits arranged one synchronisation circuit removed from the one having the unstable input. This may be the case if the synchronisation circuits are arranged such that the direct neighbouring circuits are held closed and the incorrect data that is captured the first time is not propagated during that first half clock cycle. This depends on the arrangements of the synchronisation circuits, but clearly an additional half cycle to transmit the stall signal provides a system where more time can be allowed for the detection of the error and the sending of the control signal.

It should be noted that although the transmission of the first control signal may in some embodiments be delayed by more than a half clock cycle, the transmission of the further stall signals between neighbours occurs every half clock cycle.

Although the predetermined time can be selected to be at any place within a clock cycle depending on the arrangement of the design, in some embodiments said predetermined time starts at a beginning of a half clock cycle.

Generally, one wishes to detect unstable events that occur at the start of the clock cycle as this is the period immediately after the time that one expects the capture of the data to have occurred.

In some embodiments, said predetermined time is a fraction of a half clock cycle, and said control circuitry is responsive to said error detecting circuitry detecting said error to transmit said control signal to at least one group containing said subsequent synchronisation circuit, said subsequent synchronisation circuit being a synchronisation circuit that said synchronisation circuit with said unstable input is configured to transmit data to via a number of intermediate synchronisation circuits, such that said at least one group stalls for a clock cycle said number of half cycles later than said half clock cycle that said data input was detected as being unstable in, said number being inversely dependent upon said fraction.

One way of increasing the time between detecting an error and sending a control signal to stall the system is to limit the predetermined time to a fraction of the half clock cycle. In this way, one can deduce that if for example the data input was late but within the first third of the half clock cycle then one probably has three half clock cycles until it reaches the end of that half clock cycle and causes a failure by not being captured. Thus, one only needs to send the control signal to synchronisation circuits located three synchronisation circuits further on and thus, this signal can be sent to these circuits or groups of circuits three half clock cycles later. By limiting the predetermined time in this way one can increase the number of half clock cycles in which one can send a stall signal and still avoid the instability reaching the end of the half clock cycle before the stall which would cause an error that could not be corrected. Clearly if one limits the predetermined time too much then one may not detect an error that occurs later than this predetermined time, and thus, the selection of the predetermined time is done depending on the data processing circuit and its characteristics.

In some embodiments, said plurality of synchronisation circuits comprise latches, said latches being responsive to one phase of said clock cycle to receive and retain a data input and to an opposite phase of said clock cycle to output said data, neighbouring latches being responsive to opposite clock phases to receive and retain said data.

Although, the synchronised circuits can be a number of things, the system works particularly well if they are latches. Latches have an open phase during which they can receive data and a closed phase. If neighbouring latches have opposite phases then during a half clock cycle one latch will be open and any data received during this half clock cycle will be captured, even though it may be arriving after the latch opens. Furthermore, if a latch is open its neighbours are all closed and therefore, there are no short paths, that is no data arrives early, so that a data transition during the open phase of a latch must be due to a long data path, i.e. the data arriving late. Also, as changes due to long paths will generally occur close to the opening of the gate no data changes close to the closing edge of the latch which reduces the possibility for meta stability on the data path.

Although the nature of latches makes them particularly suitable for embodiments of the invention, other synchronisation circuits such as flip flops could also be used. In such cases it may be necessary to store previous data values and reload them into the synchronisation circuit following detection of an error and prior to a stall.

In some embodiments, said groups of synchronisation circuits comprise groups of latches responsive to a same phase of said clock cycle.

Where the synchronisation circuits are latches then the group should be arranged so that latches in a same group all respond to a same phase of the clock cycle. Arranging the groups in this way enables the stalled signal to be propagated suitably to neighbouring groups.

In some embodiments, said predetermined time lies within said half clock cycle between said latch opening to receive said data and before it closes.

The predetermined time for detecting when an error occurs in the case of latches should lie in the half clock cycle between the latch opening to receive the data and before it closes. This is the time that data can still be captured, but if it arrives during this time it is arriving late as it should be there when the latch opens. Thus, placing the predetermined time here enables the detection of data that is arriving late but still being captured.

In some embodiments, said plurality of groups of synchronisation circuits comprise clock gating circuitry, said clock gating circuitry being responsive to receipt of said stall signal to gate said clock clocking said synchronisation circuits within said group for one cycle and to transmit said stall signal to said clock gating circuitry of said neighbouring groups.

Although, the stalling of the synchronisation circuits could be done in a number of ways, it is effective to use clock gating circuitry. Clock gating circuitry can be used to control groups of synchronisation circuits and thus, when a stall signal is sent to a group, a clock gating circuitry responds to it by gating the clock that clocks the synchronisation circuits within the group and transmitting it to the clock gating circuitry of the neighbouring groups. In this way, clock gating circuitry can be provided per group of synchronisation circuits and the overhead associated with this additional control circuitry reduced. The size of the groups is selected depending on the particular design. The larger the group the lower the overhead of the additional control circuitry, however a group cannot be too large as a stall signal needs to be sent to all members within the group within the half clock cycle. Thus, the length of the clock cycle of a particular circuit is a limiting factor on the potential size of the groups.

In some embodiments, said error detected by said error detecting circuitry is compensated for by said stalling of said synchronisation circuits and said data processing circuitry is configured to continue processing with a one cycle delay.

The arrangement of embodiments of this invention is such that the detected error is compensated for by simply stalling the synchronisation circuit and the data processing circuitry can continue processing with the one cycle delay. Thus, no re-issue of instructions or architectural dependent restoration circuitry is required. One simply stalls the synchronisation circuits and adds an extra delay to the output when one detects an error.

In some embodiments, said control circuitry is configured to detect a frequency of occurrence of said errors and to adjust at least one of a frequency of said clock signal and a supply voltage level powering said data processing circuitry to maintain said error frequency within predetermined limits.

In addition to detecting the errors and sending the stall signals, the control circuitry can also determine the frequency of the errors detected and in response to this can control the parameters of the circuit that affect this frequency. Thus, if it detects the error frequency to be higher than a predetermined amount, it can either increase the supply voltage or decrease the clocking frequency. The desired frequency of errors is kept low so that the circuit does not stall often, as clearly if it stalls often then there will be additional delays added to the circuit. However, if there are no errors then the system is probably operating at too slow a clock frequency or with too high a voltage and it could be optimised to improve its performance.

In some embodiments, said control circuitry is configured to detect said error frequency at different locations within said data processing circuitry and to skew said clock signal such that synchronisation circuits with a high error frequency receive a clock edge starting a phase of said clock cycle during which they capture data later and receive said phase of said clock cycle for less than half a clock cycle.

In addition to detecting the overall error frequency, the control circuit may also be configured to detect the error frequency at different locations. If an error occurs at a particular synchronisation circuit quite often, then the control circuit can skew the clock signal that is sent to that synchronisation circuit later and provided the clock phase during which it captures data is shortened, this is a localised effect. In this way, this circuit will be artificially given a later time at which to capture data and this should reduce its error frequency. The circuitry should be such that a clock phase of one synchronisation circuit being longer or shorter than its neighbours does not cause errors, this is the case where there are no short data paths, i.e. paths where data arrives early such that it is difficult to determine if a detected instability is due to a signal arriving late or a short path.

In some embodiments, said control circuitry is configured to detect said error frequency at different locations within said data processing circuitry and to adjust said supply voltage at said different locations.

Alternatively or additionally, the control circuitry can adjust the supply voltage at different locations and thus, if a certain portion of the circuit is providing more errors than another portion it can have its supply voltage increased. In this way, the circuit can be optimised to reduce error frequency without increasing power consumption by as much as would be the case if the whole circuit had its supply voltage increased.

A second aspect of the present invention provides a method of processing data in data processing circuitry, said data processing circuitry comprising: a plurality of synchronisation circuits for capturing and transmitting said data in response to a clock signal and a plurality of combinational circuits arranged between said synchronisation circuits for processing said data, said plurality of synchronisation circuits being arranged in at least two groups of synchronisation circuits; said method comprising the steps of: determining if said data input to one of said plurality of synchronisation circuits is stable during a predetermined time and signalling an error if said data input is unstable; in response to said error signal: transmitting a control signal to at least one of said groups of synchronisation circuits that contains a subsequent synchronisation circuit that said synchronisation circuit with said unstable input is configured to transmit said data to; in response to receipt of said control signal: each of said groups of synchronisation circuits transmit a stall signal to at least one further group of synchronisation circuits that said group of synchronisation circuits is configured to transmit data to or receive data from; in response to receipt of said stall signal: said synchronisation circuits that have not stalled in a preceding clock cycle stall for a clock cycle and transmit a stall signal to said at least one further group of synchronisation circuits.

A third aspect of the present invention provides processing means for processing data, said processing means comprising: a plurality of synchronisation means for capturing and transmitting said data in response to a clock signal and a plurality of combinational means arranged between said synchronisation means for processing said data, said plurality of synchronisation means being arranged in at least two groups of synchronisation means; an error detecting means for determining if said data input to one of said plurality of synchronisation means is stable during a predetermined time and for signalling an error if said data input is unstable, said predetermined time being less than a half cycle of said clock signal; control means for transmitting a stall signal to one of said groups of synchronisation means that contains a subsequent synchronisation means that said synchronisation means with said unstable input is configured to transmit said data, in response to said error detecting means signalling said error; said one of said groups of synchronisation means being responsive to receipt of said stall signal to stall for a clock cycle such that data is not captured or transmitted by any synchronisation means within said group during said clock cycle and to transmit said stall signal to all groups of synchronisation means that are neighbours to said group of synchronisation means, a group being a neighbour to another group if it receives data from or transmits data to said group not via any intermediate synchronisation means; said groups of synchronisation means being configured to respond to receipt of a stall signal from a neighbouring group to stall for a clock cycle and to transmit a stall signal to all neighbouring groups except those neighbouring groups that said stall signal has been received from.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
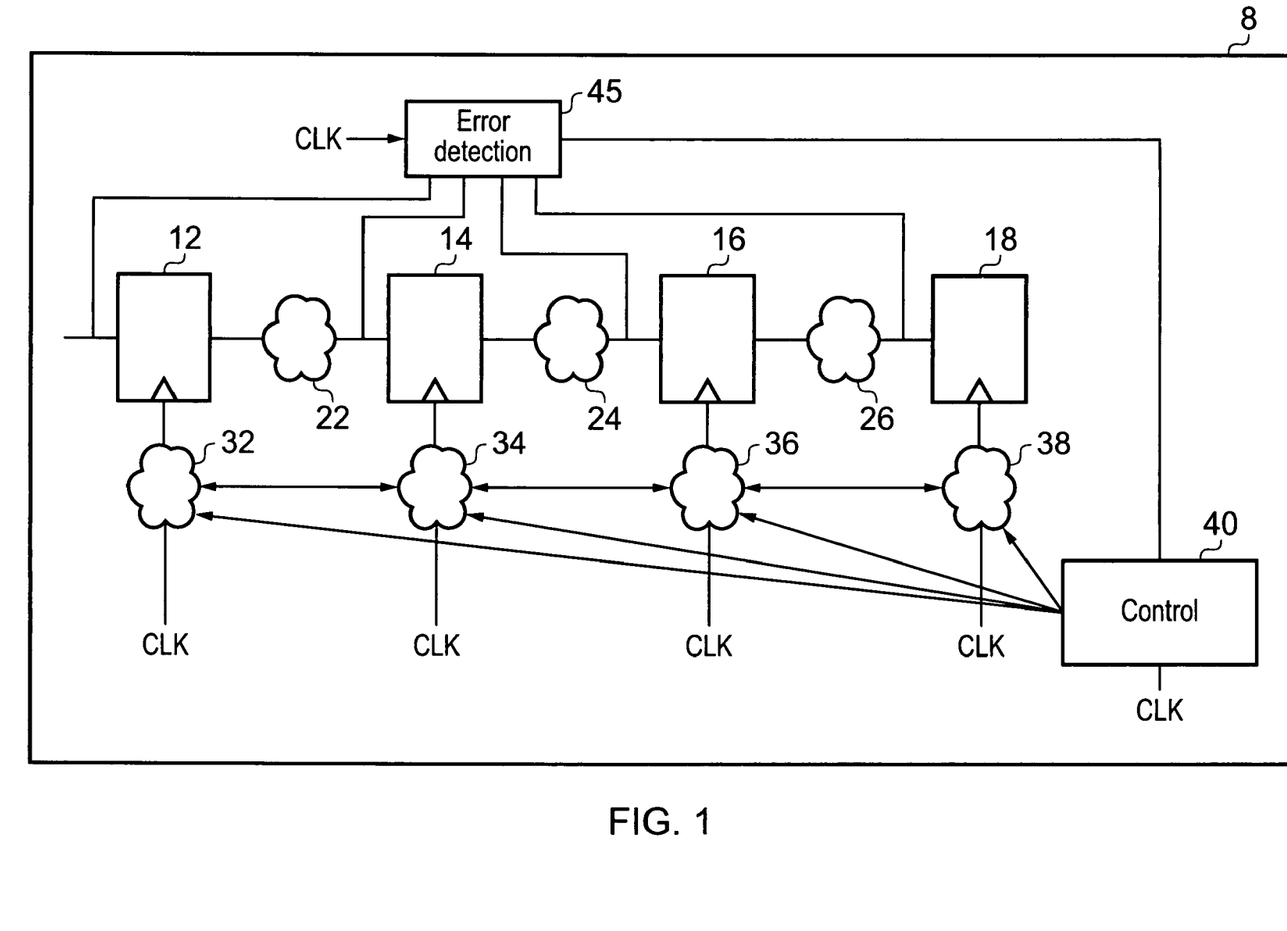
FIG. 1 schematically shows a data processing apparatus according to an embodiment of the present invention.

FIG. 1 schematically shows a portion of a data processing apparatus 5 according to an embodiment of the present invention. Data processing apparatus 5 has several synchronisation elements 12, 14, 16 and 18 which in this example are latches arranged in series with combinational logic 22, 24, 26 between them. These synchronisation circuits and combinational logic form a portion of a data path within data processing apparatus 5. Data is passed from synchronisation element 12 through synchronisation element 14, 16 and 18 in response to a clock signal and processing is performed upon the data by combinational logic 22, 24 and 26. Thus, as in this example the synchronisation elements 12, 14, 16 and 18 are latches, during a first phase of a clock cycle latch 12 is open and data is received at its input and as it is a transparent latch the data value is retained within the latch during this phase of the clock cycle and is present at its output. Combinational logic 22 therefore processes this data value and when the clock phase changes latch 12 closes and latch 14 opens and receives the processed data at its input. This procedure continues through the chain of latches and combinational logic elements.

Error detection circuitry 45 detects the value at the input to each of the latches during the phase of the clock cycle when the latch is open. It detects whether the data value at the input changes during this phase of the clock cycle. If the data value changes, then this indicates that the new value sent via the preceding combinational logic stage reached the input to the latch later than it should have done. The new value should be at the input of the latch as the latch opens if the circuit is functioning within normal time constraints. Thus, if the error detection circuit 45 detects an unstable input value during the time that the latch is open, it will signal this error to control circuitry 40. Control circuitry 40 responds to the detection of the unstable data input by sending a control signal to clock gating circuitry 32, 34, 36 or 38 that gates the clock of the latch subsequent to the one where the error was detected. In response to this control signal the clock gating circuitry gates the clock signal sent to the latch. Thus, if the error was detected at the input to latch 14 control circuitry 40 will send a control signal to clock gating circuitry 36 which will gate latch 16 half a clock cycle later for the next clock cycle. Thus, the latch 16 will open a clock cycle later than it would do normally and thus, the data output by latch 14, although arriving late at latch 14 will arrive at latch 16 on time as this latch is now delayed. Although the control circuitry and error detection circuitry are both shown as blocks 40 and 45, it should be appreciated that in many embodiments they will in fact be distributed throughout the apparatus, being close to the portions they are detecting and or controlling.

Clock gating circuitry 36 in addition to gating the clock for one clock cycle will transmit the stall signal to clock gating circuitry gating the neighbouring latches, that is latches from which latch 16 receive and transmits data. Thus, clock gating circuitry 36 sends a stall signal to clock gating circuitry 34 and 38 and a half clock cycle after latch 16 stalls these two latches both stall. This means that latch 14 will not receive and transmit data ahead of stalled latch 16 but will stall as well. Furthermore, clock gating circuitry 34 will send a stall signal to clock gating circuitry 32 to gate latch 12 a half clock cycle later. It will not send a clock gating stall signal to clock gating circuitry 36 as it received the stall signal from this circuitry and in this embodiment signals are only sent to neighbours from whom one does not receive a signal. In this way the stall signal propagates out from the subsequent latch to the one where the error was detected and the latches stall one after the other in this fan out arrangement and the error is therefore removed and the data is output a clock cycle later than would have been the case if this error had not been detected.

In other embodiments the stall signal may be sent to all neighbours and the latches will be configured not to stall if they stalled in an immediately preceding cycle. They may also be configured not to send the stall signal further if they stalled in an immediately preceding cycle and in this way the stall signal will automatically terminate when all latches have stalled once. This functionality of not stalling if you have stalled in an immediately preceding cycle can be implemented in a number of ways. In one embodiment a flip flop is added to the clock gating circuitry. The flip flop's input is the control signal to the clock gating circuitry ANDed with the input clock. Thus, the flip flop stores a 0 if the clock was gated in the previous cycle and a 1 if it was not. The output of the clock gating circuitry that clocks the latches it controls is then generated by NANDing the output of the flip flop with the OR of all the stall signals coming in from neighbors. In this way the signal will only go low (gate the clock) if both the flip flop was holding a 1 (it did not stall last cycle) and the OR of the neighbor's stall signals is 1 (it receives a signal to stall). This way of controlling the propagation and termination of the stall signal has the advantage of being area efficient and having a short critical path.

Figure 2:
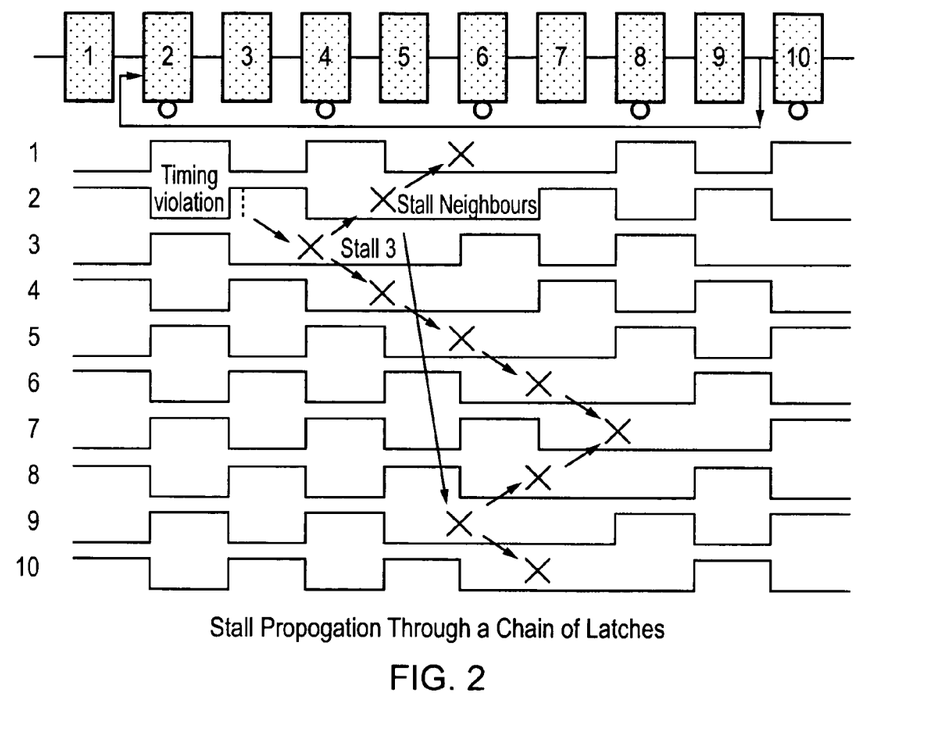
FIG. 2 shows a timing diagram illustrating stall propagation through a chain of latches.

FIG. 2 shows a chain of latches with a feedback loop and a timing diagram indicating how the stall propagates through the latches in response to an error being detected. In this example, an error indicating a timing violation is detected at the input to latch 2. Having detected this, control circuitry sends a control signal indicating that the subsequent latch in this case latch 3 should stall in the next half clock cycle. Thus, latch 3 stalls as can be seen from the timing diagram. In addition to stalling, latch 3 will send a stall signal to its neighbours and thus, it sends a stall signal to latch 2 and to latch 4 and in the subsequent half clock cycle they too stall. They then send a stall signal to their neighbours and thus, latch 2 sends one to latch 2 but not to latch 3 as it received the signal from latch 3 and it also sends it to latch 9 as it communicates with latch 9. Latch 4 sends a stall signal to latch 5. Thus, in the next half clock cycle latch 1, latch 9 and latch 5 stall. Latch 5 then sends a stall signal to latch 6 and latch 9 to latches 8 and 10 and in the next half clock cycle they stall. Latches 6 and 8 both then send a stall signal to latch 7 and latch 7 does not propagate the stall signal further as both of its neighbours sent it a stall signal. In this way, the stall eventually resolves and terminates. It has been mathematically proven that every latch in the design will stall once and exactly once regardless of circuit configuration provided this rule of transmitting a stall to your neighbours but not to the neighbour that transmitted the stall to you is followed.

Figure 3:
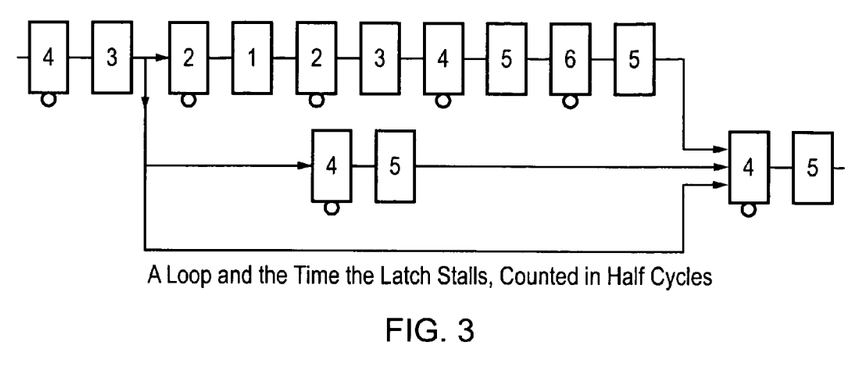
FIG. 3 shows the timing of latch stalls counted in half cycles of latches comprising a loop.

FIG. 3 shows a more complicated circuit with several latches in parallel and it shows the half cycle in which the stall occur. Thus, as in FIG. 2 the timing violation is detected at the input to latch 2 and thus, its subsequent latch stalls first and this is marked as half clock cycle 1. Its neighbouring latches stall in half clock cycle 2 and their neighbouring latches in half clock cycle 3. Latch 3 communicates with the latches in the parallel paths and thus, in clock cycle 4 its preceding latch and the subsequent latches in the parallel paths are all stalled. These latches then transmit the stall signal to their neighbours and the final stall signal is sent in the 6th half clock cycle from either side to the penultimate latch in the top chain. This latch does not send a stall signal further as it has no neighbours from which it did not receive a stall signal.

In the preceding examples the control signal sent the stall signal in half a clock cycle. However, when the design is made with latches as in the example of FIG. 1 then it is not actually necessary to send the control signal within the first half clock signal. An additional half cycle can be allowed between the data transition and the first clock gating event due to the nature of the latches. As neighbouring latches are always closed when the current latch is open then during the first half clock cycle the incorrect data that has been captured at the beginning of this clock cycle is not propagated, and by the time the neighbouring latches open the correct data is within this latch and thus, the correct data is propagated. Thus, the direct neighbouring latches do not need to stall and subsequent neighbouring latches can stall a half clock cycle later and the correct data will not be lost. This allows additional time for the error detection and control circuitry to detect the error and to transmit the control signal to the subsequent latch to stall it.

Figure 4:
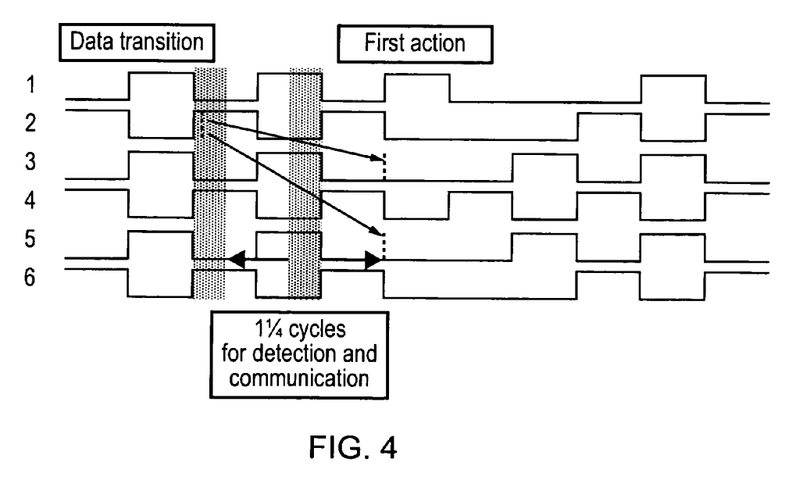
FIG. 4 shows a timing diagram of latch stalls where the error is detected in the first half of a clock phase.

FIG. 4 shows a timing diagram where even more time can be allowed for stalling of the subsequent latch. In this example, the predetermined time in which the error is detected is not the half clock cycle during which the latch is open but is only the first half of this half clock cycle. In this case, the timing violation that caused it to arrive late only caused it to arrive late by less than half a cycle and thus, this lateness will not propagate beyond the end of the clock cycle in the next half clock cycle. This, one can safely wait for an additional half clock cycle before needing to stall the subsequent latch. If the predetermined time will reduce still further then additional cycles could be used. Thus, if the predetermined time is within the first third of the clock cycle one could allow three half clock cycles before one needed to worry that the timing violation would go beyond the edge of the open phase of the latch and so on. Clearly the predetermined time reduction should not be too great or one may miss a late arriving data input signal that is beyond this predetermined time window.

Although, in the previous embodiments, the source signal is propagated to single neighbouring synchronisation elements, in some embodiments the synchronisation elements can be grouped and they can be stalled as a group. This has the advantage of requiring less control circuitry.

Figure 5:
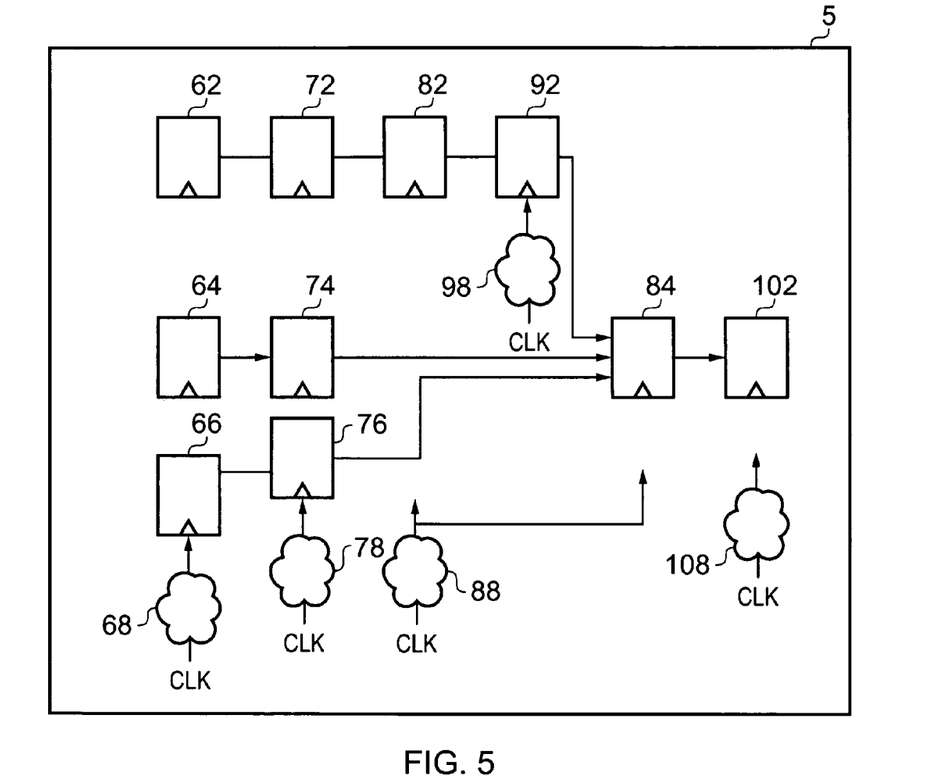
FIG. 5 schematically shows a data processing apparatus 5 where the latches are arranged in groups.

FIG. 5 schematically shows a data processing apparatus 5 having synchronisation elements arranged in groups. Thus, in this example synchronisation elements 62, 64 and 66 form a first group that is controlled by clock gating circuitry 68. Synchronisation elements 72, 74 and 76 form a second group controlled by clock gating circuitry 78. Synchronisation elements 82 and 84 form a third group controlled by clock gating circuitry 88 while synchronisation element 92 forms a fourth group and synchronisation element 102 forms a fifth group. These are respectively controlled by clock gating circuitry 98 and 108. In this example the synchronisation elements are latches and groups are formed by latches that are open or closed in the same clock phase. Group 1 latches are neighbours to group 2 latches and thus, clock gating circuitry 68 will send stall signals or receive stall signals from clock gating circuitry 78. Clock gating circuitry 78 gates group 2 and group 2 is a neighbour to group 3 which contains synchronisation elements 82 and 84. Thus, if a stall signal is sent from clock gating circuitry 78 to clock gating circuitry 88 synchronisation elements 82 and 84 are stalled. Synchronisation element 82 is a neighbour to synchronisation element 92 and synchronisation element 72 while synchronisation element 84 is a neighbour to synchronisation element 92 and synchronisation element 102. Thus, if clock gating circuitry stalls in response to a signal from clock gating circuitry 78 it transmits a stall signal to clock gating circuitry 98 and 108 and thus, they stall their respective synchronisation elements in response to this stall signal. This will be the final stall signal as they would then have no neighbours from whom they have not received a stall signal.

It should be noted that synchronisation elements can be grouped in many different ways. Where the synchronisation elements are latches they need to be grouped in groups that are open or closed on the same clock phase. Furthermore, as they are controlled to stall during the same clock phase they need to be arranged close to each other in order for the stall signal to propagate within the required time. Clearly the number of synchronisation circuits within a group and the allowed distance between them will depend on the length of the clock cycle.

Figure 6:
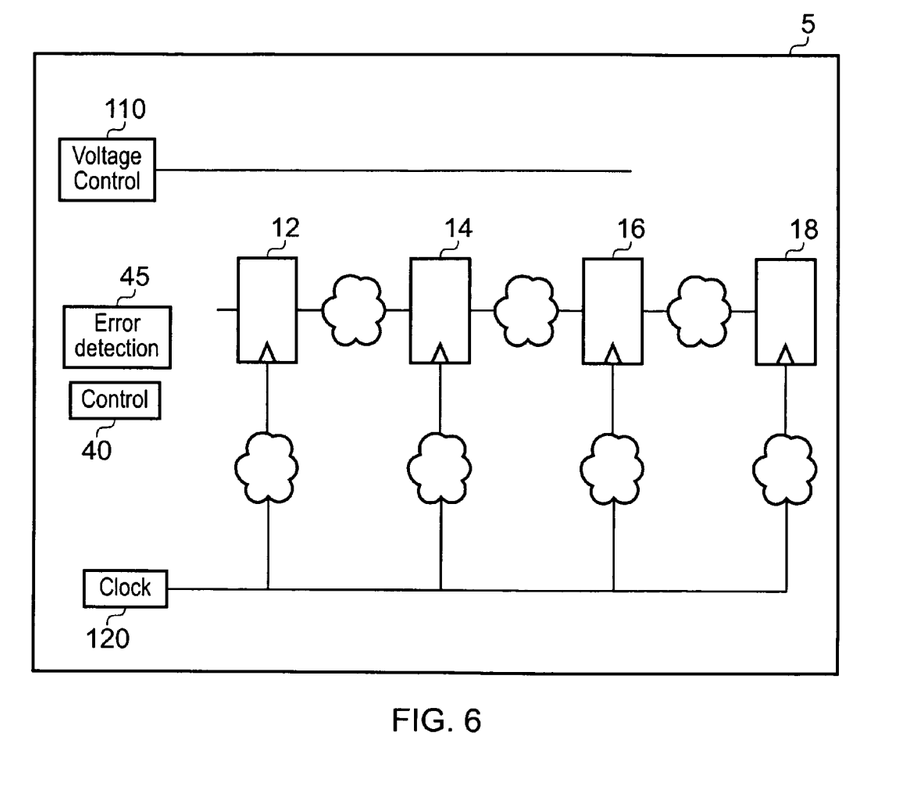
FIG. 6 schematically shows a data processing apparatus with voltage control and clock control according to an embodiment of the present invention.

FIG. 6 shows schematically a data processing apparatus 5 having a chain of synchronisation elements 12, 14, 16 and 18 with combinational logic there-between. There is also a voltage control circuitry 110 for controlling the level of the supply voltage powering the synchronisation element and there is clock generation circuitry 120 for generating the clock signal. Error detection circuitry 45 detects errors within the apparatus and in conjunction with control circuitry 40 determines the frequency of these error signals and whether they fall outside of predetermined desirable limits. There is an error rate within the circuit that is considered to be optimal, where the reduction in voltage level and/or increase in clock speed that generates that predicted number of errors is more than sufficient to compensate for the additional delay caused by the one cycle stalls to correct for the errors. Clearly if the voltage levels were dropped too low or the clock frequency increased too much so that errors became common then the cycle delays would cause the circuit to react more slowly. Alternatively, if there are no errors at all then the circuit may be operating at a voltage level or clock frequency far in excess of what it requires.

Error detection circuitry 45 and control circuitry 40 detect the error frequency at various points within the circuit and if the frequency passes outside of a desired band the voltage control circuitry 110 may be controlled to increase the voltage level to that portion of the circuit where the error rate has become too high or to decrease the voltage level if the error rate has dropped below the desired value. Alternatively, the clock signal may be controlled to a portion of the circuit where the error rate has grown too high to skew the clock circuit so that the synchronisation element that is producing too high an error rate so that the synchronisation element stays open for more than half the clock cycle. This works if the synchronisation element is for example a latch and therefore there are no short paths. A short path is a path by which a signal may arrive too early at the synchronisation element. Such early signals are difficult to distinguish from late signals as these signals change during the detected period and thus, may trigger an error. In the case of latches then latches are closed when neighbouring latches are open and thus, short paths do not exist. If one skews the clock of one latch then it will be open when its neighbour is open for a short period and this can cause problems if short paths exist.

It should be noted, that although technique of embodiments of this invention can be applied without any knowledge of the internal architecture of the circuit, the external pin behaviour of the circuit would change as an extra clock cycle delay is added and thus, inputs and outputs of the circuit should be able to stall. As many ports on conventional processors already come with an enable signal attached and many things such as memory may already take a variable number of cycles to return the data then providing inputs and outputs with this function is not difficult.

In addition to dealing with stalls, outputs should not be sent from the circuit that are speculative, and thus, the timing of the circuit should assume that outputs will be captured by a negative latch, while in reality they will be captured by a positive flip flop. This will allow an extra half cycle for outputs to resolve and help ensure that output data has stabilised to the correct value before it is captured by an external device.

It should be noted, that although many of these embodiments are described with respect to latches, they may also be designed with other synchronisation elements. If, for example flip flops are used then as the data is captured at the rising edge, any late data will not be captured and thus, additional storage may be required to store data values. However, although additional storage may be required to store values, it is only the data values that need to be stored and the system synchronised so that they can be sent at the correct time with respect to the stalls, there is no need to re-issue any instructions or have any particular knowledge of the architecture.

If additional storage is not desirable, then a conventional flip flop based design could be converted into a latch based design and this can be done automatically with software by replacing every flip flop in the design with a master and slave latch and then re-timing the design. By amending the design to be latch based no correction circuitry is needed to store the circuit's correct state or feedback past values. This is because an error arriving after the latch opened but before it closes will be captured, so that such an error does not immediately corrupt the state of the processor, rather it borrows time from the stages in the circuit downstream. A failure only occurs if the data arrives after the latch closes which could occur if the time borrowing effect compounds to the point where a downstream stage no longer has enough time to process data. For this reason, the design should be run at a speed such that no failures can occur without first being preceded by an error in a previous stage that can be corrected for.

Figure 7:
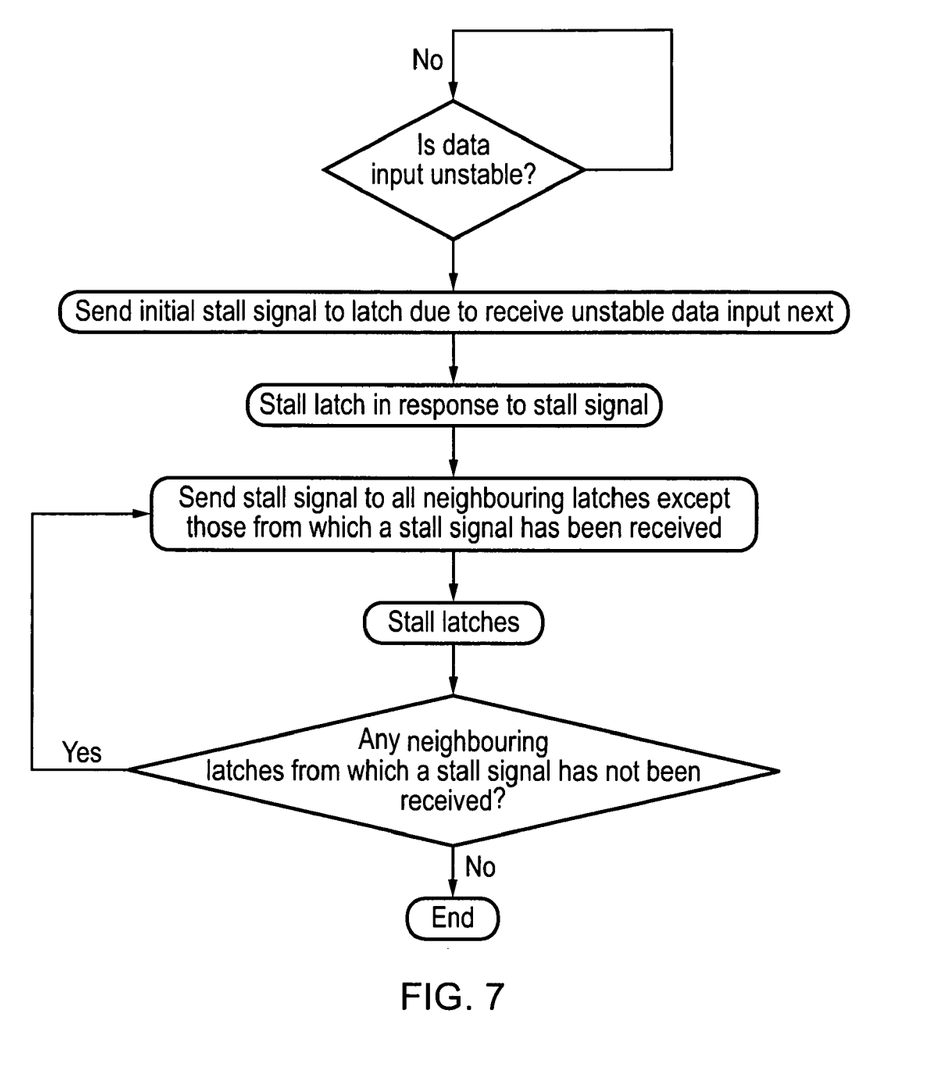
FIG. 7 shows a flow diagram illustrating a method of an embodiment of the present invention.

FIG. 7 shows a flow diagram showing very schematically a method according to an embodiment of the present invention. In this method it is determined if a data input is unstable within a predetermined time. If it is detected as being unstable then this corresponds to an error and a stall signal is sent by control circuitry to the latch that is due to receive the unstable data next. This allows this timing violation to be corrected. The stall signal then needs to be propagated through the system in order for the timing of the system to compensate for the stall. Thus, the stalled latch sends stall signals to all its neighbours except those from whom the original stall signal was received. All latches that received the stall signal then look to see if there are any further neighbouring latches to send the stall signal to. If there are then the stall signal is sent to these neighbouring latches except those from whom the stall signal was received. If there aren't then this is the end of propagation of the stall signal for this particular error and the error has been corrected and the correct data is output a cycle later than it would have been output had the system not detected an error.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. Data processing circuitry for processing data, said data processing circuitry comprising:
   a plurality of synchronisation circuits for capturing and transmitting said data in response to a clock signal and a plurality of combinational circuits arranged between said synchronisation circuits for processing said data, said plurality of synchronisation circuits being arranged in at least two groups;
   an error detecting circuit for determining if said data input to one of said plurality of synchronisation circuits is stable during a predetermined time and for signalling an error if said data input is unstable;
   control circuitry responsive to said error detecting circuit signalling said error to transmit a control signal to at least one of said groups of synchronisation circuits that contains a subsequent synchronisation circuit that said synchronisation circuit with said unstable input is configured to transmit said data to;
   each of said group of synchronisation circuits being configured to respond to receipt of said control signal to transmit a stall signal to at least one further group of synchronisation circuits that said group of synchronisation circuits is configured to transmit data to or receive data from;
   each of said group of synchronisation circuits being configured to respond to receipt of said stall signal provided they have not stalled in the preceding clock cycle to stall for a clock cycle and to transmit a stall signal to said at least one further group of synchronisation circuits.

2. Data processing circuitry according to claim 1, wherein each of said group of synchronisation circuits are configured to respond to receipt of said control signal to stall for a clock cycle and to transmit said stall signal.

3. Data processing circuitry according to claim 1, wherein said at least one further group of synchronisation circuits comprises all groups that contain neighbouring subsequent synchronisation circuits except those groups that said stall signal has been received from.

4. Data processing circuitry according to claim 1, wherein said subsequent synchronisation circuit is a neighbouring subsequent synchronisation circuit.

5. Data processing circuitry according to claim 3, wherein a synchronisation circuit is a neighbour to another synchronisation circuit if data passing between said neighbouring synchronisation circuits does not pass through any intermediate synchronisation circuits.

6. Data processing circuitry according to claim 3, wherein a group is a neighbour to another group if it is located physically close to said another group.

7. Data processing circuitry according to claim 1, said predetermined time being half a clock cycle or less.

8. Data processing circuitry according to claim 1, wherein no synchronisation circuit is a member of more than one group, and each group comprises at least one synchronisation circuit.

9. Data processing circuitry according to claim 1, wherein said circuitry comprises a plurality of subsequent synchronisation circuits that said synchronisation circuit with said unstable input is configured to transmit said data to, said control circuitry being responsive to said error detecting circuit signalling said error to transmit a control signal to all groups of synchronisation circuits that comprise at least one of said plurality of subsequent synchronisation circuits.

10. Data processing circuitry according to claim 2, wherein said control circuitry is responsive to said error detecting circuitry detecting said error to transmit said control signal to said group containing said subsequent synchronisation circuit such that said group starts said clock cycle stall during an immediately following half clock cycle to said half clock cycle that said data input was detected as being unstable.

11. Data processing circuitry according to claim 2, wherein said at least one of said groups of synchronisation circuits that said control signal is transmitted to contains said subsequent synchronisation circuit, and said subsequent synchronisation circuit is a synchronisation circuit that said synchronisation circuit with said unstable input is configured to transmit data to via one intermediate synchronisation circuit, said control circuitry is responsive to said error detecting circuitry detecting said error to transmit said control signal to said at least one group containing said subsequent synchronisation circuit such that said group stalls for a clock cycle one cycle later than said half clock cycle that said data input was detected as being unstable.

12. Data processing circuitry according to claim 1, wherein said predetermined time starts at a beginning of a half clock cycle.

13. Data processing circuitry according to claim 1, wherein said predetermined time is a fraction of a half clock cycle, and said control circuitry is responsive to said error detecting circuitry detecting said error to transmit said control signal to at least one group containing said subsequent synchronisation circuit, said subsequent synchronisation circuit being a synchronisation circuit that said synchronisation circuit with said unstable input is configured to transmit data to via a number of intermediate synchronisation circuits, such that said at least one group stalls for a clock cycle said number of half cycles later than said half clock cycle that said data input was detected as being unstable in, said number being inversely dependent upon said fraction.

14. Data processing circuitry according to claim 5, wherein said plurality of synchronisation circuits comprise latches, said latches being responsive to one phase of said clock cycle to receive and retain a data input and to an opposite phase of said clock cycle to output said data, neighbouring latches being responsive to opposite clock phases to receive and retain said data.

15. Data processing circuitry according to claim 14, wherein said groups of synchronisation circuits comprise groups of latches responsive to a same phase of said clock cycle.

16. Data processing circuitry according to claim 14, wherein said predetermined time lies within said half clock cycle between said latch opening to receive said data and before it closes.

17. Data processing circuitry according to claim 1, said plurality of groups of synchronisation circuits comprising clock gating circuitry, said clock gating circuitry being responsive to receipt of said stall signal to gate said clock clocking said synchronisation circuits within said group for one cycle and to transmit said stall signal to said clock gating circuitry of said neighbouring groups.

18. Data processing circuitry according to claim 1, wherein said error detected by said error detecting circuitry is compensated for by said stalling of said synchronisation circuits and said data processing circuitry is configured to continue processing with a one cycle delay.

19. Data processing circuitry according to claim 1, wherein said control circuitry is configured to detect a frequency of occurrence of said errors and to adjust at least one of a frequency of said clock signal and a supply voltage level powering said data processing circuitry to maintain said error frequency within predetermined limits.

20. Data processing circuitry according to claim 19, wherein said control circuitry is configured to detect said error frequency at different locations within said data processing circuitry and to skew said clock signal such that synchronisation circuits with a high error frequency receive a clock edge starting a phase of said clock cycle during which they capture data later and receive said phase of said clock cycle for less than half a clock cycle.

21. Data processing circuitry according to claim 19, wherein said control circuitry is configured to detect said error frequency at different locations within said data processing circuitry and to adjust said supply voltage at said different locations.

22. A method of processing data in data processing circuitry, said data processing circuitry comprising:
  a plurality of synchronisation circuits for capturing and transmitting said data in response to a clock signal and a plurality of combinational circuits arranged between said synchronisation circuits for processing said data, said plurality of synchronisation circuits being arranged in at least two groups of synchronisation circuits; said method comprising the steps of:
  determining if said data input to one of said plurality of synchronisation circuits is stable during a predetermined time and signalling an error if said data input is unstable;
  in response to said error signal:
  transmitting a control signal to at least one of said groups of synchronisation circuits that contains a subsequent synchronisation circuit that said synchronisation circuit with said unstable input is configured to transmit said data to;
  in response to receipt of said control signal:
  each of said groups of synchronisation circuits transmit a stall signal to at least one further group of synchronisation circuits that said group of synchronisation circuits is configured to transmit data to or receive data from;
  in response to receipt of said stall signal:
  said synchronisation circuits that have not stalled in a preceding clock cycle stall for a clock cycle and transmit a stall signal to said at least one further group of synchronisation circuits.

23. Processing means for processing data, said processing means comprising:
  a plurality of synchronisation means for capturing and transmitting said data in response to a clock signal and a plurality of combinational means arranged between said synchronisation means for processing said data, said plurality of synchronisation means being arranged in at least two groups of synchronisation means;
  an error detecting means for determining if said data input to one of said plurality of synchronisation means is stable during a predetermined time and for signalling an error if said data input is unstable, said predetermined time being less than a half cycle of said clock signal;
  control means for transmitting a stall signal to one of said groups of synchronisation means that contains a subsequent synchronisation means that said synchronisation means with said unstable input is configured to transmit said data, in response to said error detecting means signalling said error;
  said one of said groups of synchronisation means being responsive to receipt of said stall signal to stall for a clock cycle such that data is not captured or transmitted by any synchronisation means within said group during said clock cycle and to transmit said stall signal to all groups of synchronisation means that are neighbours to said group of synchronisation means, a group being a neighbour to another group if it receives data from or transmits data to said group not via any intermediate synchronisation means;
  said groups of synchronisation means being configured to respond to receipt of a stall signal from a neighbouring group to stall for a clock cycle and to transmit a stall signal to all neighbouring groups except those neighbouring groups that said stall signal has been received from.

* * * * *